Sept. 8, 1959 R. D. WEATHERBY 2,903,184
RECORDING MECHANISM FOR FLUID PUMPS
Filed March 4, 1955 2 Sheets-Sheet 1

INVENTOR:
ROBERT D. WEATHERBY
BY Howson & Howson
ATTYS.

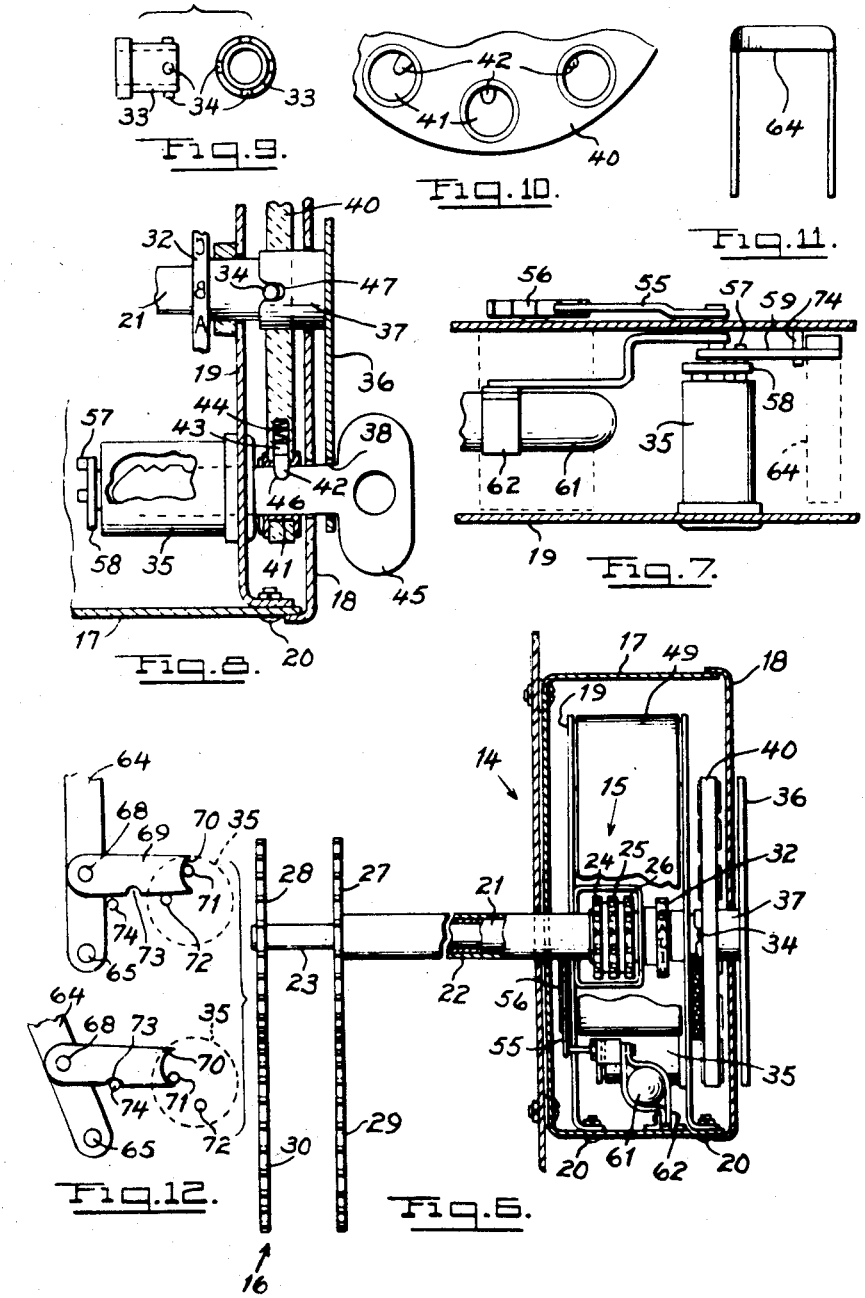

United States Patent Office 2,903,184
Patented Sept. 8, 1959

2,903,184
RECORDING MECHANISM FOR FLUID PUMPS

Robert D. Weatherby, Saint John,
New Brunswick, Canada

Application March 4, 1955, Serial No. 492,198

5 Claims. (Cl. 235—94)

This invention relates to recording devices for fluid pumps.

In fluid pumps, such for example as gasoline pumps, the meter system is provided with visible means indicating the measured quantity of gasoline or other fuels dispensed and the cost thereof in dollars and cents. While such indicating means are quite satisfactory to the purchaser, they do not compute, record or indicate the measured quantity or quantities of gasoline or other fuels dispensed and sold by an individual attendant or salesman, particularly where there are several salesmen. Thus where discrepancies occur in the sales, it is practically impossible to know and identify which of several salesmen are responsible for the differences in sold quantities and cash receipts.

It is therefore one of the objects of the present invention to avoid and overcome the foregoing and other objections and disadvantages by providing a device of this character which automatically records dollars and cents or the measured quantity or quantities of gasoline dispensed and sold by each individual salesman on printable paper.

A further object of the present invention is to provide a device of this character wherein each salesman or attendant is furnished with a separate pump operating key and such key carries a specific identification numeral or other indicia which identifies a particular salesman and such key differs from all other pump operating keys.

Another object of the invention is to provide a device of this character wherein each sale of each individual salesman or attendant is automatically computed and recorded in printed form by a recording device at the termination of each sale and may be referred to any any time or at the close of the business day.

Still another object of the invention is to provide a device of this character which is novel and practical and wherein the unitary structure may be attached to fluid pumps already in existence.

Having regard to the foregoing and other objects and advantages which will become apparent as the description proceeds and the details become known, the invention consists of the novel combination and arrangement of parts hereinafter described in more particular detail and illustrated in the accompanying drawings in which:

Figure 6 is a sectional view taken on the line 6—6 of Figure 3 showing the present invention operatively connected to the metering gears of a fluid pump;

Figure 7 is an enlarged sectional view taken on the line 7—7 of Figure 2;

Figure 8 is an enlarged sectional view showing the key operated lock with inner and outer lock dial members;

Figure 9 is a side and end view of the hub member for operating the printing wheel shaft;

Figure 10 is an elevational view of a fragmentary portion of the inner lock dial member with key engageable tumblers, and Figure 11 is a front elevational view of the printing striker member while Figure 12 illustrates the type striker member in different operative positions.

Figure 3:
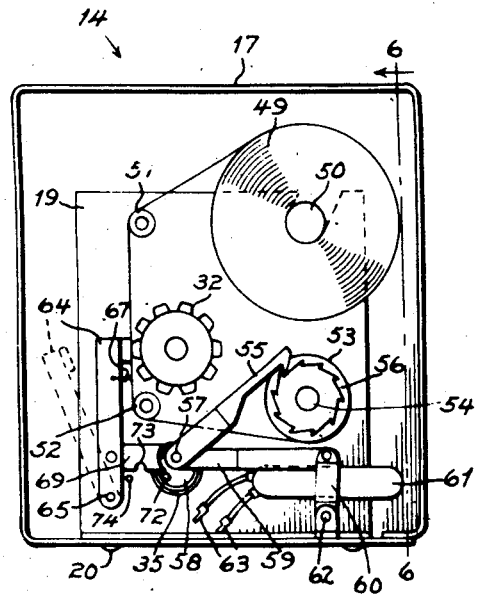
Figure 3 is a view similar to Figure 2 as seen from the reverse side of the operating mechanism.

Referring now to the accompanying drawings wherein an embodiment of the present invention is disclosed and wherein like numerals of reference designate corresponding parts in the various illustrations, the numeral 14 indicates the present invention as a whole including recording device 15, all shown operatively connected to metering gears 16 of a standard fluid pump.

As presently illustrated, a housing or casing 17 is provided to protectively enclose the recording device while access to the interior of the housing is provided in the form of a hinged door or closure cover 18. A frame 19 is mounted within the housing for supporting the recording mechanism 15 and related elements and is detachably secured to the base of the housing by means of bolts or the like 20.

For operative purposes, unit 15 is provided with supporting shaft 21, adding gear shaft 22 and re-set gear shaft 23. Shafts 22 and 23 are operatively connected to quantity computing and recording discs 24, 25 and 26 as well as adding gear 27 re-set gear 28. From the foregoing it will be seen that as fluid is dispensed from the fluid pump, gears 29 and 30 function in their usual and well known manner to indicate to the purchaser the quantity and amount of the sale. At the same time and simultaneous with such operation, discs 24, 25 and 26 are rotated correspondingly to record the quantity of fluid sold by a specific individual or salesman on the unit 15.

Identification for each individual sales or serviceman may take the form of numerals, letters or other appropriate indicia which are arranged on the outer periphery of the salesman's recording disc 32. The disc 32 is fixedly mounted on a sleeve 33 which is provided with driving pins 34, the sleeve being freely rotatable on supporting shaft 21. Thus sleeve 33 with recording disc 32 is rotatable independently of its support and may be set at a preselected indicia independently of the operation of the quantity recording discs 24, 25 and 26.

Adjacent the base of the housing or casing 17, I provide lock unit 35 which is adapted to control fluid pump operation. In order to operate the lock however a specific lock operating key is required for each sales or serviceman and each individual key differs from all other pump operating keys and bears or carries indicia conforming to the indicia on the salesman's recording disc 32.

Figure 1:
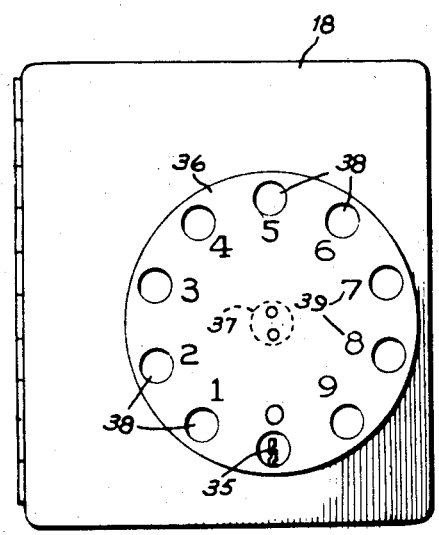
Figure 1 is a front elevational view of an embodiment of my present invention with the door of the device shown in closed position.

In order to insure that the right pump operating key is employed to operate the lock 35, I provide the housing with an outer register dial 36. This dial is fixedly secured to hub member 37 by means of screws or the like and is rotatably mounted on the outside of door 18. The register dial, as will be observed by reference to Figs. 1 and 8, is provided with a series of apertures or openings 38, each identified by indicia 39 which corresponds to the indicia represented on the salesman's recording disc 32. The outer dial 36 therefore may be freely rotated to align a preselected opening of the register dial 36 with the lock 35.

A further and inner register dial 40 is also fixedly mounted on hub 37 and arranged on the inside of door 18. The inner dial 40 is provided with a series of openings or orifices 41 which conform in spacing and arrangement with the openings in outer dial 36. The door 18 is also provided with an opening aligned with lock 35 so that a pump operating key may be extended through the aligned openings in the dials and door inserted in the lock 35.

It is important to observe that a specific pump operating key is required for each number or other indicia carried by the outer register dial 36 in order to operate lock 35. Each opening or orifice 41 of the inner register dial 40 is provided with tumbler elements. The tumbler structure is well known in the art and as presently illustrated includes pin members 42 and 43 actuated by spring 44. By particular reference to Fig. 10, it will be seen that lower tumbler pins 42 extend into the respective openings 41 different distances. Correspondingly, each key member, which is designated by the numeral 45, is formed with a recess 46, such recess conforming in depth to the protruding length of a specific tumbler pin. It will be seen therefore that each pump operating key 45 will function and operate when used in conjunction with only one particular and identified set of tumbler elements and that the key will not operate with any other set or sets of tumbler elements.

Figures 4, 5:
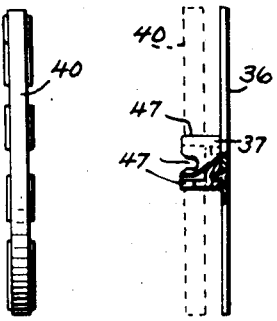
Figure 4 is an end elevational view of the inner lock dial.
Figure 5 is an end elevational view of the outer lock dial.

As illustrated in Figs. 5, 6 and 8, the inner wells of the hub 37 are provided with a series of spaced recesses 47, such recesses forming accommodation for engagement by driving pins 34 associated with sleeve 33.

From what has already been described it will be seen that rotation of outer register dial 36 will cause a corresponding rotative movement of inner register dial 40 as well as the salesman's recording disc 32. Thus, when a preselected number of identifying indicia of outer dial 36 is rotated and moved into register with the lock 35, the related control elements synchronously move and become aligned with lock 35 and therefore a pump operating key 45 carrying corresponding indicia may then be inserted in lock 35. It will be noted too that by reason of the novel sleeve structure 33 with driving pins 34 and the hub member 37 with its accommodating recesses 47, the door 18 with inner and outer register dials 36 and 40 may be swung to open position to remove the recording tape or otherwise, later mentioned, and thereafter may be swung to closed position without interfering with the registration of the various identification elements previously referred to.

Turning now to the structure and mechanism for recording the quantity of fluid dispensed by each individual operator or salesman, I provide a roll of printable recording paper 49 which is mounted on spool 50. The recording paper extends over roller 51, passes downwardly immediately in front of the numeral carrying or quantity indicating discs 24, 25 and 26, over roller 52 when it passes to winding spool 53 mounted on shaft 54.

The winding of the recording paper on spool 53 is effected through the operation of lock 45 in combination with arm 55 and ratchet 56 which is associated with winding spool 53. The means for operating the ratchet 56 and rotating winding spool 53 includes arm 55 pivotally connected to eccentric pin 57 mounted on disc 58, the disc in turn being rotatable with the barrel of lock 35. When operated by any one of the series of keys 45, the rotation of the lock will pull ratchet engaging arm 55 causing ratchet 56 to rotate winding spool 53 and wind the recording paper 49 thereon.

Figure 2:
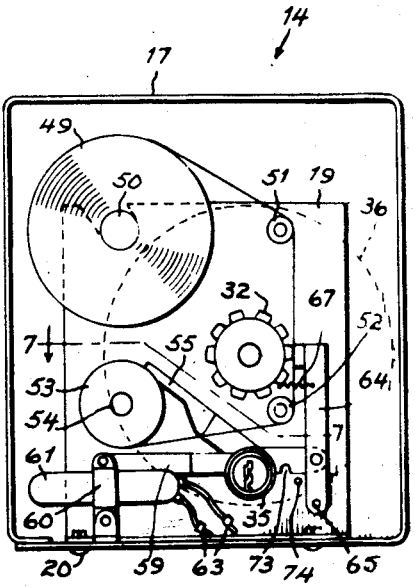
Figure 2 is a view similar to Figure 1 but with the door open to illustrate the operating mechanism.

As illustrated in Figures 2 and 3, ratchet arm 55 is pivotally connected to horizontal arm 59. At one end, arm 59 is connected to the tiltable supporting frame 60 of mercury switch 61 while at its opposite end arm 59 is connected to eccentric pin 57. The frame 60 is pivotally mounted in the main housing as indicated at 62 while suitable terminals 63 are provided for the mercury switch. Thus, when the mercury switch is tilted from a horizontal position, as will be later explained, an electric motor operating circuit will be closed for pump operating purposes.

The type striker member which is designated by the numeral 64 is pivotally connected to the main frame as indicated at 65 and is retained in a normally vertical position by means of tension spring 67. Pivotally and swingably connected to the type striker as indicated at 68 is the striker operating arm 69, see Figures 3 and 12. The free end of arm 69 is of concave or cam like formation as indicated at 70 and is engageable by eccentric pin 71 which is mounted on lock 35. A secondary eccentric pin 72, also mounted on lock 35, is designed to trip arm 69 and release the striker arm for imprinting purposes as will be later referred to.

At its lower edge, arm 69 is provided with a slot 73 so that when the said arm is moved to a given position, the slot 73 of the arm is moved into engagement with a fixed pin 74 which is mounted on the main frame. From what has been described it will be seen that as lock 35 is rotated, eccentric pin 71 moving in cam 70 will force striker arm 64 outwardly under the tension of spring 67. As striker member 64 swings outwardly under the tension of spring 67, arm 69 also moves outwardly and downwardly so that the slot 73 of arm 69 is brought into engagement with fixed pin 74 and until the lock 35 is further operated, the type strike member 64 is maintained in the position shown in dotted lines in Figure 3.

When the key 45 is turned in the lock 35 for removal, there is a delayed action before eccentric pin 72 engages the base of arm 69 at which time the key 45 is at an angle of approximately 10 degrees to the vertical and such movement insures that the operator cannot remove the key slowly for purposes of preventing the striker member from striking the paper for type imprinting purposes. At this point, further rotation of a key in lock 35 causes pin 72 to raise the free end of arm 69 to release the arm from engagement with the fixed pin 74 when the tension of spring 67 automatically forces the type striker arm inwardly with a snap causing it to imprint the type characters 24, 25, 26 and 32 on paper 49.

Simultaneous with the rotation of lock 35, release of the type striker arm and the removal of the key, the arm 59 moves backward to tilt mercury switch 61 to a substantially horizontal position and thus open the electric motor operating circuit in preparation for the next succeeding operation.

Operation

In operation and when fluid is to be dispensed from the pump by a particular or specific salesman, such individual rotates outer register dial 36 manually until the opening of his specific identifying number, for example 4, is in register with the lock 35. The rotation of outer dial 36 will simultaneously rotate inner dial 40 and the salesman's printing indicia or register 32. As a result of this operation, the opening designated by the numeral 4 plus a conforming opening 41 of inner dial 40 will be in register with lock 35 while the salesman printing or identifying indicia disc 32 will be moved to its printing position. The salesman's specific key 45 will then be inserted in lock 35 and turned in a clockwise direction. The turning of the key will, through arm 69 move striker 64 outwardly free of the printable paper where it is temporarily locked under pressure, cause arm 55 to operate ratchet 53 and wind paper 49 on spool 53 and at the same time automatically tilt mercury switch 61 causing it to close an electric circuit and put the fluid pump into operation. The operation of the fluid pump automatically rotates the quantity indicating printing discs 24, 25 and 26, all as previously mentioned.

When the desired quantity of fluid has been dispensed, key 45 is then turned anti-clockwise, such operation causing pin 72 to move the free end of arm 69 upwardly sufficiently to disengage recess 73 thereof from engagement with pin 74 when the tension of spring 67 will cause the striker 64 to snap sharply against the printable paper 49 when the quantity of fluid dispensed plus the salesman's identifying indicia will be imprinted thereon.

It will be observed of course that when the lock 35 is operated for the next succeeding sale, the initial turning of the key 45 will wind the paper 49 on spool 53 and thus preserve the record of the preceding sale. It will further be noted that by virtue of the differences in the tumbler elements 42 on the inner dial 40 and the conformation of recesses 46 in the respective keys 45, such structure will permit only one specific key to operate the lock under a corresponding numeral or indicia counter dial 36 and none of the remaining series of keys will operate the lock under that particular outer dial number.

Many changes may be made in the above and many apparently widely different embodiments constructed without departing from the spirit or the essential characteristics of the invention. It is intended therefore that the present disclosure be interpreted as illustrative and not in a limiting sense.

I claim:

1. In a recording device operable in combination with the metering system of a fluid dispensing pump, numeral carrying printing members operatively connected with the metering system, an independently movable key identifying indicia member associated with the printing members, a lock for the fluid dispensing pump, print recording paper advanceable by said lock, a striker member for imprinting the numerals and key identifying indicia on the recording paper operative by the lock, a circuit closing switch for the fluid dispensing pump operatively connecting the lock, and a series of different key members operable to rotate the said lock in one direction to simultaneously close the said switch, move the recording paper and swing the striker member free of the recording paper and to rotate in the opposite direction to simultaneously release the striker member to imprint the numerals and key identifying indicia on the recording paper and to open the said switch to discontinue operation of the fluid dispensing pump.

2. In a recording device operable in combination with the metering system of a fluid dispensing pump, numeral carrying printing members operatively connected with the metering system, an independently movable key identifying indicia member associated with the printing members, manually operable selective means for moving the key identifying indicia, a lock for the fluid dispensing pump, a circuit closing switch for the fluid dispensing pump operatively connecting the lock, print recording paper advanceable by said lock over the printing members connected with the said lock, a striker member for imprinting the numerals and key identifying indicia on the recording paper operative by the lock, a series of different key members for operating the said lock, an inner lock dial having a series of key member receiving openings thereon, each adapted to receive one only of said key members, said lock dial being connected with said selective means for aligning one of said openings with said lock to permit entry of a selected one of said key members in said lock corresponding to the key identifying indicia moved to imprinting position, said key members being operable to rotate said lock in one direction to simultaneously close the said circuit switch, move the print recording paper and swing the striker member free of the recording paper and for rotation of the lock in the opposite direction to simultaneously release the striker member for imprinting the numerals and key identifying indicia on the recording paper and opening the said switch to discontinue operation of the said fluid dispensing pump.

3. In a recording device operable in combination with the metering system of a fluid dispensing pump, numeral carrying printing members operatively connected with the metering system, an independently movable key identifying indicia member associated with the said printing members, a disc member provided with key receiving openings and identifying indicia for operating said independently movable key identifying indicia member, a lock for the fluid dispensing pump, print recording paper advanceable by said lock, a striker member for imprinting the numerals and key identifying indicia on the recording paper operative by said lock, an inner lock dial having a series of key member receiving openings thereon, each adapted to receive only one key member, said lock dial being connected with said disc member for aligning one of said key member receiving openings with said lock to permit entry of only a selected key member in said lock corresponding to the key identifying indicia moved to imprinting position, a circuit closing switch for the fluid dispensing pump operatively connecting the said lock, ratchet means connecting the lock for winding the recording paper on a spool, and a series of different key members operable to rotate the lock in one direction to simultaneously close the said switch, move the recording paper and swing the striker member free of the recording paper and to rotate the said lock in the opposite direction to simultaneously release the striker member for imprinting the numerals and key identifying indicia on the said paper and to open the said switch to discontinue operation of the said fluid dispensing pump.

4. A device as claimed in claim 1 wherein releasable locking means are provided for retaining the striker member in spaced relationship to the recording paper during operation of the fluid pump and for releasing the said striker when the operation of the pump is discontinued.

5. A device as claimed in claim 1, wherein spaced inner and outer dial members are selectively rotatable simultaneously and provided with spaced orifices to permit a predetermined key to operate the fluid pump lock and the said orifices of the inner dial being provided with tumblers extending thereinto differing distances to prevent other than a predetermined key to operate the said lock.

References Cited in the file of this patent

UNITED STATES PATENTS

| | | |
|---|---|---|
| 1,010,675 | Muzzy | Dec. 5, 1911 |
| 1,078,012 | Tomlinson | Nov. 11, 1913 |
| 1,204,242 | Bradley | Nov. 7, 1916 |
| 1,475,368 | Chilson | Nov. 27, 1923 |
| 2,522,845 | Stevens | Sept. 19, 1950 |
| 2,643,792 | Daley et al. | June 30, 1953 |